(12) United States Patent
Nishida

(10) Patent No.: US 12,170,411 B2
(45) Date of Patent: Dec. 17, 2024

(54) ANTENNA DEVICE, ANTENNA MODULE, COMMUNICATION DEVICE, AND RADAR DEVICE

(71) Applicant: Murata Manufacturing Co., Ltd., Kyoto (JP)

(72) Inventor: Hiroshi Nishida, Kyoto (JP)

(73) Assignee: MURATA MANUFACTURING CO, LTD., Kyoto (JP)

( * ) Notice: Subject to any disclaimer, the term of this patent is extended or adjusted under 35 U.S.C. 154(b) by 715 days.

(21) Appl. No.: 17/238,306

(22) Filed: Apr. 23, 2021

(65) Prior Publication Data

US 2021/0242602 A1     Aug. 5, 2021

Related U.S. Application Data

(63) Continuation of application No. PCT/JP2019/041981, filed on Oct. 25, 2019.

(30) Foreign Application Priority Data

Oct. 29, 2018  (JP) .................................. 2018-202806

(51) Int. Cl.
*H01Q 9/04* (2006.01)
*H01Q 19/02* (2006.01)

(52) U.S. Cl.
CPC ......... *H01Q 9/0407* (2013.01); *H01Q 19/023* (2013.01)

(58) Field of Classification Search
None
See application file for complete search history.

(56) References Cited

U.S. PATENT DOCUMENTS 10,403,954 B2 *  9/2019  Moallem ................ H01Q 13/02
2009/0015499 A1   1/2009  Kuroda
(Continued)

FOREIGN PATENT DOCUMENTS

CN       103996901 A  *  8/2014
EP         1928052 A1  *  6/2008  .............. H01P 5/107
(Continued)

OTHER PUBLICATIONS

International Search Report issued in Application No. PCT/JP2019/041981, dated Dec. 17, 2019.
(Continued)

*Primary Examiner* — Dameon E Levi
*Assistant Examiner* — Anh N Ho
(74) *Attorney, Agent, or Firm* — Pearne & Gordon LLP

(57) ABSTRACT

An antenna device includes a substrate, a first ground layer, a radiation electrode, and waveguide structures. Each of the waveguide structures has a slit and a conductor wall. The slit is positioned in an electric field direction of the radiation electrode and provided in the first ground layer. The conductor wall surrounds the slit and extends in a thickness direction of the substrate. A dimension of the waveguide structure in a magnetic field direction in plan view is greater than ½ of a wavelength of a radio wave emitted by the radiation electrode in a medium of the substrate. A length from the slit to a terminal portion of the waveguide structure is about ¼ of a wavelength of the radio wave emitted by the radiation electrode in the waveguide structure.

17 Claims, 11 Drawing Sheets

(56) References Cited

U.S. PATENT DOCUMENTS

| | | | |
|---|---|---|---|
| 2011/0187482 A1 | 8/2011 | Ohno et al. | |
| 2012/0050131 A1* | 3/2012 | Hashimoto | H01P 1/042 |
| | | | 29/601 |
| 2016/0301125 A1* | 10/2016 | Kim | H01P 5/107 |
| 2016/0336654 A1* | 11/2016 | Aoki | H01P 3/121 |
| 2018/0090851 A1 | 3/2018 | Feldman et al. | |
| 2018/0342810 A1* | 11/2018 | Yu | H01Q 15/008 |
| 2019/0173500 A1* | 6/2019 | Artemenko | H01Q 1/247 |
| 2020/0106194 A1* | 4/2020 | Takaki | H01Q 9/0457 |

FOREIGN PATENT DOCUMENTS

| | | | | |
|---|---|---|---|---|
| JP | H09-051224 A | | 2/1997 | |
| JP | 2000138525 A | | 5/2000 | |
| JP | 2000261235 A | * | 9/2000 | |
| JP | 2007-243375 A | | 9/2007 | |
| JP | 2007235236 A | | 9/2007 | |
| JP | 2009017515 A | | 1/2009 | |
| JP | 5094871 B2 | * | 12/2012 | H01P 5/107 |
| JP | 2015226109 A | * | 12/2015 | |
| WO | 2009/017203 A1 | | 2/2009 | |

OTHER PUBLICATIONS

Written Opinion issued in Application No. PCT/JP2019/041981, dated Dec. 17, 2019.

Office Action for Japanese Patent Application No. 2020-553853 dated Jan. 5, 2022.

* cited by examiner

Fig.11
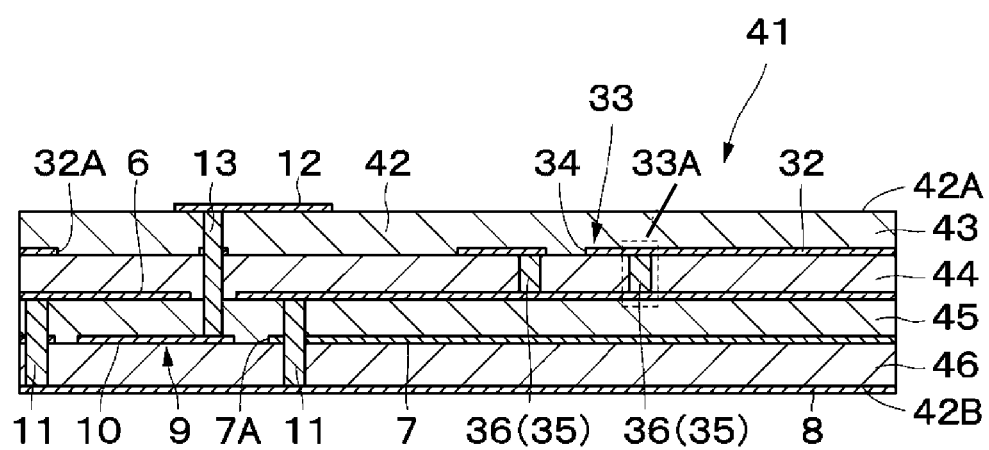
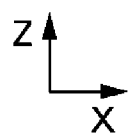

ANTENNA DEVICE, ANTENNA MODULE, COMMUNICATION DEVICE, AND RADAR DEVICE

CROSS REFERENCE TO RELATED APPLICATION

This is a continuation of International Application No. PCT/JP2019/041981 filed on Oct. 25, 2019 which claims priority from Japanese Patent Application No. 2018-202806 filed on Oct. 29, 2018. The contents of these applications are incorporated herein by reference in their entireties.

BACKGROUND OF THE DISCLOSURE

Field of the Disclosure

The present disclosure relates to an antenna device, an antenna module, a communication device, and a radar device that are preferably used for high-frequency radio waves such as microwaves and millimeter waves.

Description of the Related Art

Patent Document 1 describes an antenna device in which artificial magnetic conductor (AMC) elements are disposed around a patch antenna so as to improve the antenna gain by suppressing the propagation of a surface wave.
Patent Document 1: Japanese Unexamined Patent Application Publication No. 2009-17515

BRIEF SUMMARY OF THE DISCLOSURE

With the antenna device described in Patent Document 1, in order to sufficiently suppress the propagation of the surface wave, a certain number of the AMC elements are required. This causes a problem in that the size of the antenna device increases.

An object of one embodiment of the present disclosure is to provide an antenna device, an antenna module, a communication device, and a radar device that enable improvement of the antenna gain and that enable size reduction.

One embodiment of the present disclosure is an antenna device that includes a substrate, a ground electrode, a radiation electrode, and a waveguide structure. The substrate includes a plurality of insulating layers laminated one on top of another. The ground electrode is provided in or on the substrate. The radiation electrode is provided on the substrate. The waveguide structure has a slit and a conductor wall. The slit is positioned in an electric field direction of the radiation electrode in plan view and provided in the ground electrode. The conductor wall surrounds the slit and extends in a thickness direction of the substrate. A dimension of the waveguide structure in a magnetic field direction of the radiation electrode in the plan view is greater than ½ of a wavelength of a radio wave emitted by the radiation electrode in a medium of the substrate. A length from the slit to a terminal portion of the waveguide structure in the electric field direction of the radiation electrode in the plan view is about ¼ of a wavelength of the radio wave emitted by the radiation electrode in the waveguide structure.

According to the one embodiment of the present disclosure, in addition to enabling the improvement of the antenna gain by suppressing the propagation of the surface wave, the size of the entirety of the device can be reduced.

BRIEF DESCRIPTION OF THE SEVERAL VIEWS OF THE DRAWINGS

FIG. 11 is a sectional view illustrating an antenna device according to a variant at a position similar to that of FIG. 10.

DETAILED DESCRIPTION OF THE DISCLOSURE

Figure 1:
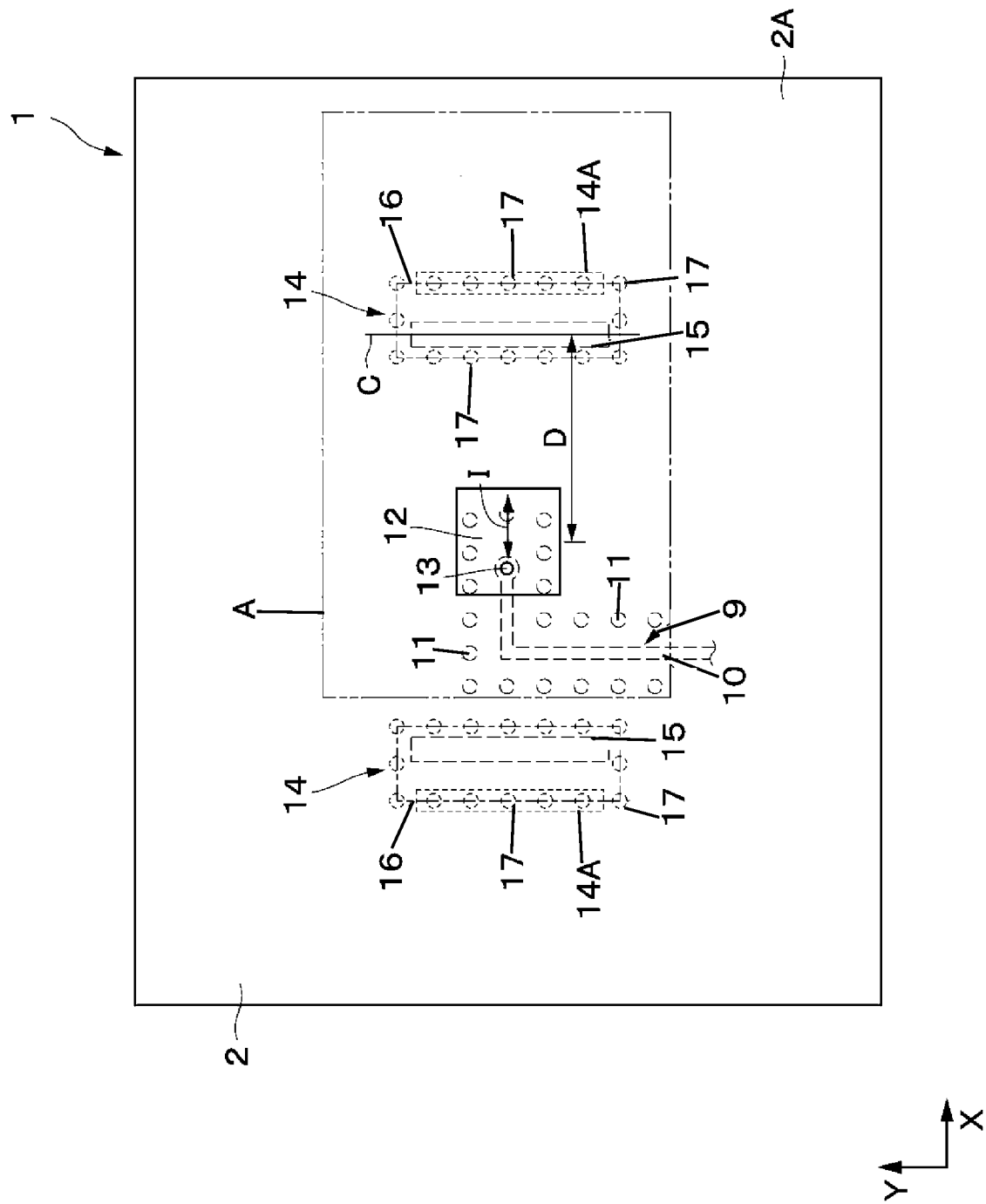
FIG. 1 is a plan view illustrating an antenna device according to a first embodiment.

Hereafter, an antenna device, an antenna module, a communication device, and a radar device according to embodiments of the present disclosure will be described in detail with reference to the accompanying drawings.

FIGS. 1 to 4 illustrate an antenna device 1 according to a first embodiment. The antenna device 1 includes a substrate 2, a first ground layer 6 (see FIG. 3), a radiation electrode 12, and waveguide structures 14. The antenna device 1 emits, for example, a millimeter-wave radio wave as a radio wave of a wavelength at which transmission/reception of a communication device is performed.

The substrate 2 is a dielectric substrate and formed to have a flat-plate shape extending parallel to, for example, the X-axis direction and the Y-axis direction out of the X-axis direction, Y-axis direction, and the z-axis direction, which are perpendicular to each other. The substrate 2 has lengths of, for example, about several mm in the Y-axis direction and about several mm in the X-axis direction and a thickness of, for example, about several hundred μm in the Z-axis direction, which is the thickness direction.

Figures 2, 3:
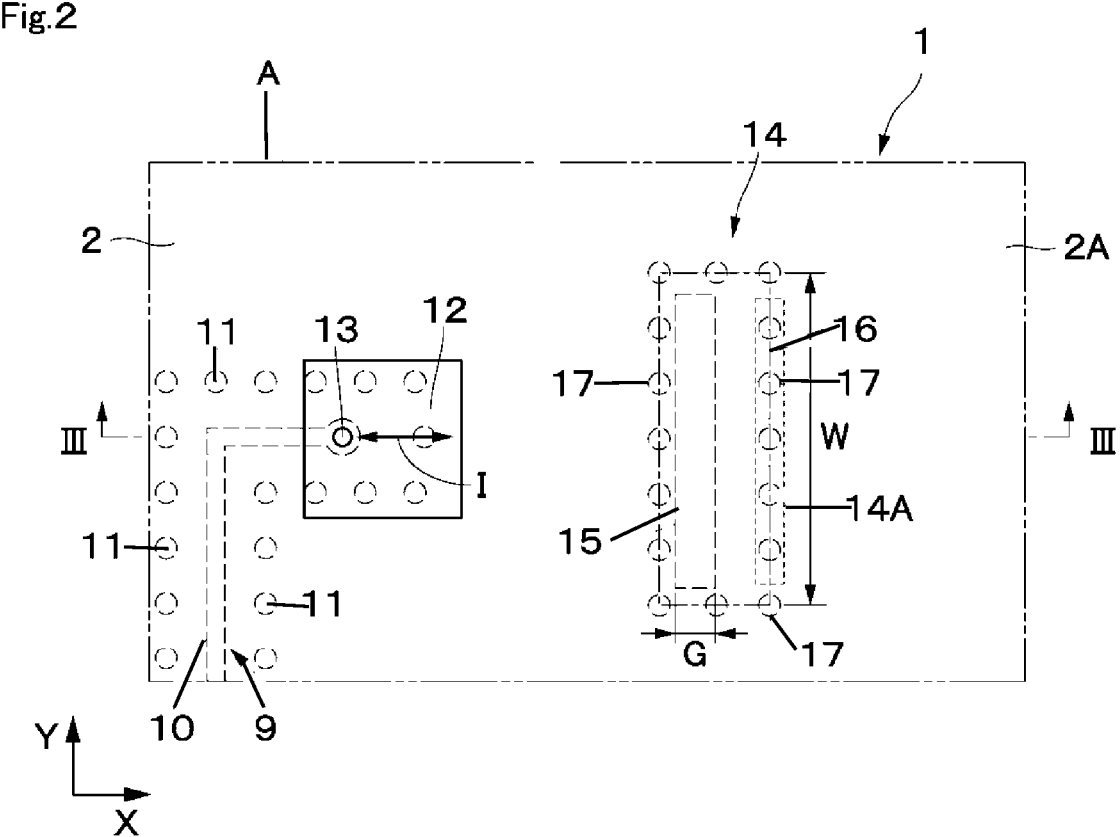
FIG. 2 is an enlarged plan view in which a part A illustrated in FIG. 1 is enlarged.
FIG. 3 is a sectional view of the antenna device when seen in an arrow III-III direction illustrated in FIG. 2.
Figure 4:
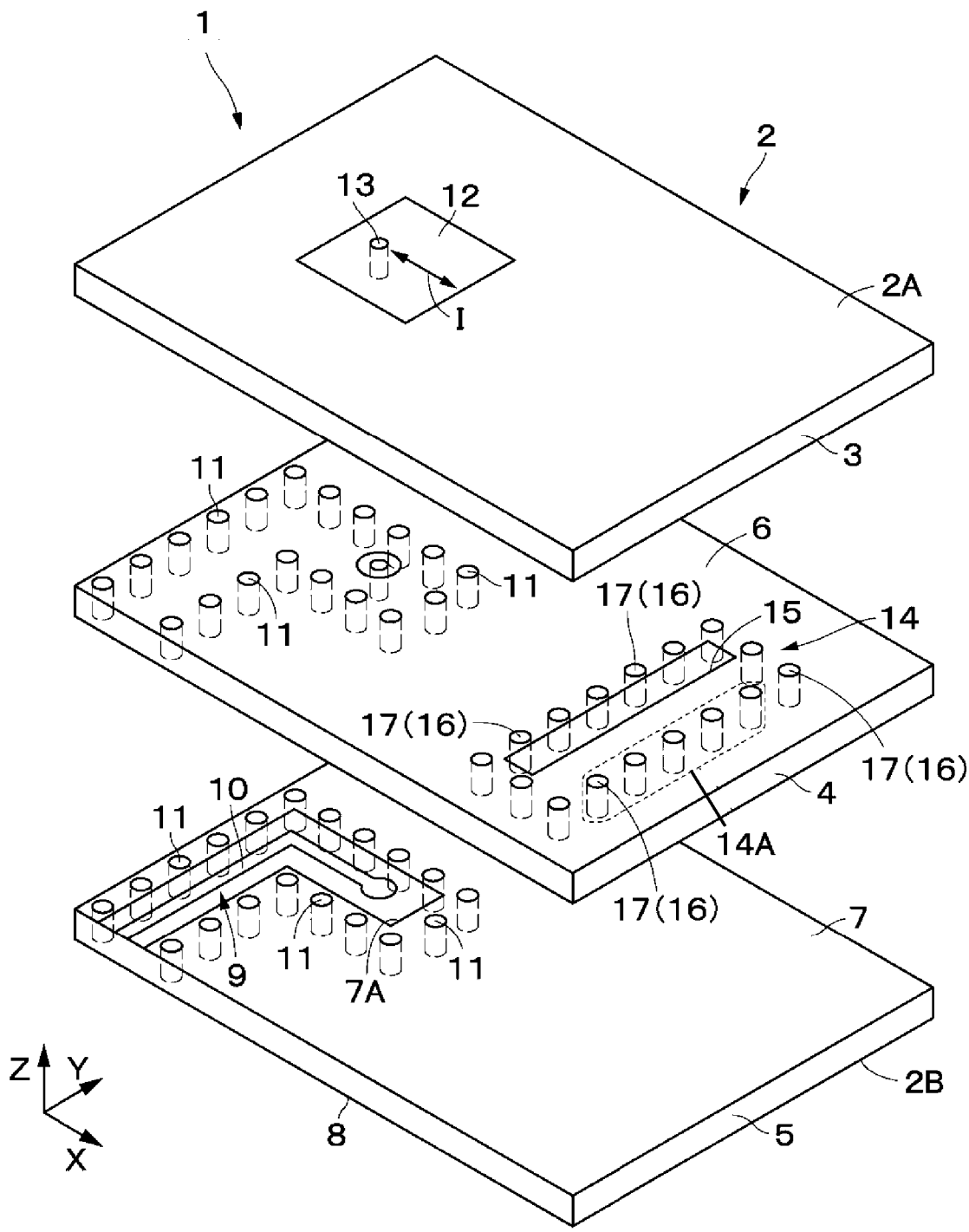
FIG. 4 is an exploded perspective view in which the antenna device illustrated in FIG. 2 is disassembled.

The substrate 2 is formed by a laminated substrate such as a low temperature co-fired ceramic laminated substrate (LTCC laminated substrate) and includes three insulating layers 3 to 5 laminated one on top of another in the Z-axis direction from a side of a first surface 2A (first main surface side) toward a side of a second surface 2B (second main surface side) (see FIGS. 3 and 4). The insulating layers 3 to 5 are each formed of an insulating ceramic material that can be fired at a low temperature of 1000° C. or below. The insulating layers 3 to 5 are formed to have a thin layered shape.

The substrate 2 is not necessarily formed by a ceramic laminated substrate formed of an insulating ceramic material. Alternatively, the substrate 2 may be formed by a resin laminated substrate formed of an insulating resin material. Alternatively, the substrate 2 may be a laminated resin substrate formed by a plurality of resin layers that are formed of a liquid crystal polymer (LCP) having a lower dielectric constant and laminated one on top of another. Alternatively, the substrate 2 may be a laminated resin substrate formed by a plurality of resin layers that are formed of a fluorine-based resin and laminated one on top of another. Alternatively, the substrate 2 may be a ceramic laminated substrate other than an LTCC laminated substrate. Alternatively, the substrate 2 may be a flexible substrate having flexibility or a rigid substrate having thermoplastic properties.

The first ground layer 6, a second ground layer 7, and a third ground layer 8 are formed by, for example, conducting metal thin films formed of copper, silver, or the like and are connected to an external ground. Alternatively, the first ground layer 6, the second ground layer 7, and the third ground layer 8 may be formed of a metal material the main component of which is aluminum, gold, or an alloy of aluminum or gold.

The first ground layer 6 serves as a ground electrode. The first ground layer 6 is included in a ground conductor plate of a patch antenna. The first ground layer 6 is positioned between the insulating layer 3 and the insulating layer 4. Thus, the first ground layer 6 is provided inside the substrate 2. The second ground layer 7 is positioned between the insulating layer 4 and the insulating layer 5. The third ground layer 8 is positioned on the second surface 2B of the substrate 2 (a second surface of the insulating layer 5 opposite the insulating layer 4). Each of the first ground layer 6, the second ground layer 7, and the third ground layer 8 covers substantially the entire surface of the substrate 2.

The first ground layer 6 faces the second ground layer 7 and the third ground layer 8. The first ground layer 6 faces the radiation electrode 12 with the insulating layer 3 interposed therebetween. The first ground layer 6 is disposed inside the substrate 2 in a state in which the first ground layer 6 is insulated from the radiation electrode 12. The first ground layer 6 and the second ground layer 7 are electrically connected to the third ground layer 8 through a plurality of vias 11. Furthermore, the second ground layer 7 has a gap 7A around a linear conductor 10. The gap 7A is formed by omitting the metal thin film. With this gap 7A, the second ground layer 7 and the linear conductor 10 are insulated from each other.

A triplate line 9 is included in a power feed line through which power is fed to the radiation electrode 12. The triplate line 9 is formed by the linear conductor 10, which is provided between the insulating layers 4 and 5, and the first and third ground layers 6 and 8. The linear conductor 10 is interposed between the first and third ground layers 6 and 8 in the thickness direction (Z-axis direction). The linear conductor 10 is formed of, for example, a conductive metal material similarly to that of the second ground layer 7 and has an elongated strip shape. A distal end of the linear conductor 10 is connected to a partway position (power feed point) of the radiation electrode 12 between a center position and an end position in the X-axis direction. The triplate line 9 allows a high-frequency signal corresponding to the radio wave emitted by the radiation electrode 12 to be transmitted therethrough. In addition, the triplate line 9 allows the power to be fed to the radiation electrode 12 therethrough so that a current I flows in the X-axis direction of the radiation electrode (see FIG. 4). FIG. 4 illustrates, as an example, a case where the triplate line 9 (linear conductor 10) is bent into an L shape in plan view. However, the present disclosure is not limited to this. The triplate line may have a linear shape or a shape having many bends.

The plurality of vias 11 are provided along the linear conductor 10 in the substrate 2. The vias 11 are formed, for example, as cylindrical conductors by providing a conductive metal material such as copper or silver into through holes that penetrate through the insulating layers 4 and 5 of the substrate 2. The vias 11 extend in the Z-axis direction and are connected to the first ground layer 6, the second ground layer 7, and the third ground layer 8. At this time, spacing between two adjacent vias 11 is set to be, for example, smaller than a quarter wavelength of the radio wave in use in terms of the electrical length. The plurality of vias 11 surround the gap 7A and are disposed along the edge portions of the gap 7A.

The radiation electrode 12 is included in a radiation element of the patch antenna. The radiation electrode 12 and the first ground layer 6 are included in the patch antenna. The radiation electrode 12 is formed of, for example, a conductive metal material similarly to that of the first ground layer 6 and has a substantially quadrangular shape. The radiation electrode 12 faces the first ground layer 6 with spacing therebetween. Specifically, the radiation electrode 12 is positioned on the first surface 2A of the substrate 2 (a first surface of the insulating layer 3 opposite the insulating layer 4). That is, the radiation electrode 12 is positioned and laminated on a first surface side of the first ground layer 6 with the insulating layer 3 interposed therebetween. Thus, the radiation electrode 12 faces the first ground layer 6 in a state in which the radiation electrode 12 is insulated from the first ground layer 6.

The radiation electrode 12 has a length of, for example, about several hundred μm to several mm in the X-axis direction and a length of, for example, about several hundred μm to several mm in the Y-axis direction. The length of the radiation electrode 12 in the X-axis direction is set to, for example, a half-wavelength of the radio wave to be emitted in terms of the electrical length.

Furthermore, a via 13 is connected to the partway position of the radiation electrode 12 in the X-axis direction, and the triplate line 9 is connected to the radiation electrode 12 through the via 13. That is, an end portion of the linear conductor 10 is connected to the radiation electrode 12 through the via 13 serving as a connection line. When the power is fed from the triplate line 9, the current I flows in the radiation electrode 12 toward the X-axis direction.

The via 13 is formed as a cylindrical conductor substantially similarly to the vias 11. The via 13 is formed to penetrate through the insulating layers 3 and 4. The via 13 extends in the Z-axis direction. One and the other ends of the via 13 are respectively connected to the radiation electrode 12 and the linear conductor 10. The via 13 serves as the connection line connecting the radiation electrode 12 and the triplate line 9 to each other. The via 13 is connected to the partway position of the radiation electrode 12 between the center position and the end position in the X-axis direction.

Each of the waveguide structures 14 has a slit 15 and a conductor wall 16. The slit 15 is positioned in an electric field direction of the radiation electrode 12 (an E-plane direction, the X-axis direction in the drawings) in plan view and provided in the first ground layer 6. The conductor wall 16 surrounds the slit 15 and extends in the thickness direction of the substrate 2. The waveguide structures 14 are positioned on both sides of the radiation electrode 12 in the direction of the current I (X-axis direction) flowing through the radiation electrode 12 (see FIG. 1). The two waveguide structures 14 form a symmetrical shape about the radiation electrode 12. The electric field direction/E-plane direction refer to a direction in which the vector of the electric field is generated.

The slit 15 is formed by an elongated gap formed in the first ground layer 6 (see FIGS. 2 and 4). The slit 15 extends in the Y-axis direction perpendicular to the current I of the radiation electrode 12. In plan view, spacing D between the radiation electrode 12 and the slit 15 is set to be greater than or equal to 0.4 times and smaller than or equal to 0.8 times a wavelength λ0 of the radio wave (radio wave emitted by the radiation electrode 12) in free space (see FIG. 1). At this time, the spacing D is a separation dimension from the center position of the radiation electrode 12 to the slit 15. Specifically, the spacing D is the distance from the center of the radiation electrode 12 to a center line C of the slit 15 extending in a magnetic field direction (an H-plane direction, the Y-axis direction in the drawings). A width G of the slit 15 in the electric field direction (X-axis direction) is set to be smaller than or equal to 1/10 of the wavelength of the radio wave in free space (see FIG. 2).

The conductor wall 16 is formed to have a quadrangular frame shape surrounding the slit 15. The conductor wall 16 includes a plurality of vias 17. The vias 17 are each formed as a cylindrical conductor substantially similarly to the vias 11. The vias 17 penetrate through the insulating layer 4. The vias 17 extend in the Z-axis direction (see FIG. 3). One and the other ends of the vias 17 are respectively connected to the first ground layer 6 and the second ground layer 7. Spacing between two adjacent vias 17 is set to be, for example, smaller than a quarter wavelength of the radio wave in use in terms of the electrical length. The waveguide structure 14 forms a rectangular waveguide extending in the X-axis direction. Thus, the section of the waveguide structure 14 at the center taken in the Y-axis direction is rectangular when seen in the X-axis direction. The conductor wall 16 may penetrate through the insulating layer 4 and the insulating layer 5 so as to be connected to the ground layer 6 and the ground layer 8.

A dimension W of the waveguide structure (14) in the magnetic field direction (H-plane direction, Y-axis direction) in plan view is greater than ½ of a wavelength λa of a center frequency of the radio wave emitted by the radiation electrode 12 in a medium of the substrate 2 (W>λa/2) (see FIG. 2). At this time, the dimension W is the distance from the center of the vias 17 positioned on a first end side of the waveguide structure 14 in the magnetic field direction to the center of the vias 17 positioned on a second end side of the waveguide structure 14 in the magnetic field direction. Preferably, the dimension W is greater than ½ of the wavelength λa and smaller than the wavelength λa (λa/2<W<λa). A length L from the slit 15 to a terminal portion 14A of the waveguide structure 14 in plan view is about ¼ of a wavelength λg of a center frequency of the radio wave emitted by the radiation electrode 12 in the waveguide structure 14 (see FIG. 3). For example, when the radiation electrode 12 emits a radio wave the center frequency of which is 79 GHz, the relative dielectric constant of the substrate 2 is 2.2, and the dimension W of the waveguide structure 14 in the Y-axis direction is 2.5 mm, the wavelength λa is 2.56 mm and the wavelength λg is 2.98 mm.

At this time, the terminal portion 14A of the waveguide structure 14 is a portion where a reflected wave is generated. The reflected wave is generated by input of the radio wave from the slit 15 and reflection of the inputted radio wave in the waveguide structure 14 so as to be returned to the slit 15. Specifically, the terminal portion 14A of the waveguide structure 14 is the conductor wall 16 positioned at a terminal position of the waveguide structure 14 in a propagating direction (X-axis direction). Thus, the length L is a propagation path length from the slit 15 to the terminal portion 14A of the waveguide structure 14. Specifically, the length L is a separation dimension from a center position of the slit 15 to the conductor wall 16 (a center position of the via 17) positioned at a terminal of the waveguide structure 14 in the X-axis direction. The center position of the slit 15 is the position of the center line C of the slit 15 extending in the longitudinal direction (Y-axis direction) (see FIG. 1). In the case of the via 17 having a circular shape in plan view, the center position of the via 17 is a position near a center point of the circle. However, it is sufficient that the center position of the via 17 be substantially at the center of the circle. It is not required that the center position of the via 17 be exactly at the center of the circle. The magnetic field direction/H-plane direction refer to a direction in which the vector of the magnetic field is generated.

At this time, the wavelength λa of the radio wave in the medium of the substrate 2 (insulating layers 3 to 5) is represented by Math. 1 below based on the wavelength λ0 of the radio wave in free space and the relative dielectric constant $\varepsilon_r$ of the medium of the substrate 2. At this time, the relative dielectric constant is measured based on, for example, the measuring method prescribed in Japanese Industrial Standards (JIS) R1660-2.

$$\lambda a = \frac{\lambda 0}{\sqrt{\varepsilon_r}} \qquad \text{[Math. 1]}$$

Furthermore, the wavelength λg of the radio wave in the waveguide structure 14 is expressed by Math. 2 below based on the length W of the waveguide structure 14 in the magnetic field direction (Y-axis direction).

$$\lambda g = \frac{\lambda a}{\sqrt{1 - \left(\frac{\lambda a}{2W}\right)^2}} \qquad \text{[Math. 2]}$$

In this way, according to the first embodiment, the antenna device 1 includes the substrate 2 including the plurality of insulating layers 3 to 5 laminated one on top of another, the first ground layer 6 (ground electrode) provided in the substrate 2, and the radiation electrode 12 provided on the substrate 2. At this time, when the power is fed from the triplate line 9 toward the radiation electrode 12, the current I flows through the radiation electrode 12 toward the X-axis direction. Thus, the antenna device 1 transmits or receives the radio wave in accordance with the length of the radiation electrode 12 in the X-axis direction.

Furthermore, in the antenna device 1, a surface wave tends to propagate around the radiation electrode 12 of the substrate 2. In order to address this, the antenna device 1 includes the waveguide structure 14 that includes the slit 15 and the conductor wall 16. The slit 15 is positioned in the electric field direction of the radiation electrode 12 in plan view and provided in the first ground layer 6. The conductor wall 16 surrounds the slit 15 and extends in the thickness direction of the substrate 2.

At this time, the dimension W of the waveguide structure 14 in the magnetic field direction in plan view is greater than ½ of the wavelength of the radio wave in the medium of the substrate 2. Thus, the frequency of the radio wave emitted by the radiation electrode 12 is higher than a cutoff frequency of the waveguide structure 14. This enables propagation of the radio wave in the waveguide structure 14.

In addition, the length L from the slit 15 to the terminal portion 14A of the waveguide structure 14 in plan view is about ¼ of the wavelength $\lambda g$ of the radio wave in the waveguide structure 14. At this time, the waveguide structure 14 functions as a short stub having a length of a quarter wavelength. Thus, the radio wave inputted to the waveguide structure 14 from the slit 15 is reflected at the terminal portion 14A, thereby the reflected wave is generated. Since the reflected wave is in an opposite phase to the radio wave inputted to the slit 15 at the position of the slit 15, the slit 15 cancels the radio wave. As a result, the slit 15 is in a state close to a substantially open state. This causes the slit 15 to interrupt (cut) the current of the surface wave flowing through the first ground layer 6, and accordingly, the disturbance of the directivity of the patch antenna due to the propagation of the surface wave can be suppressed.

Figure 5:
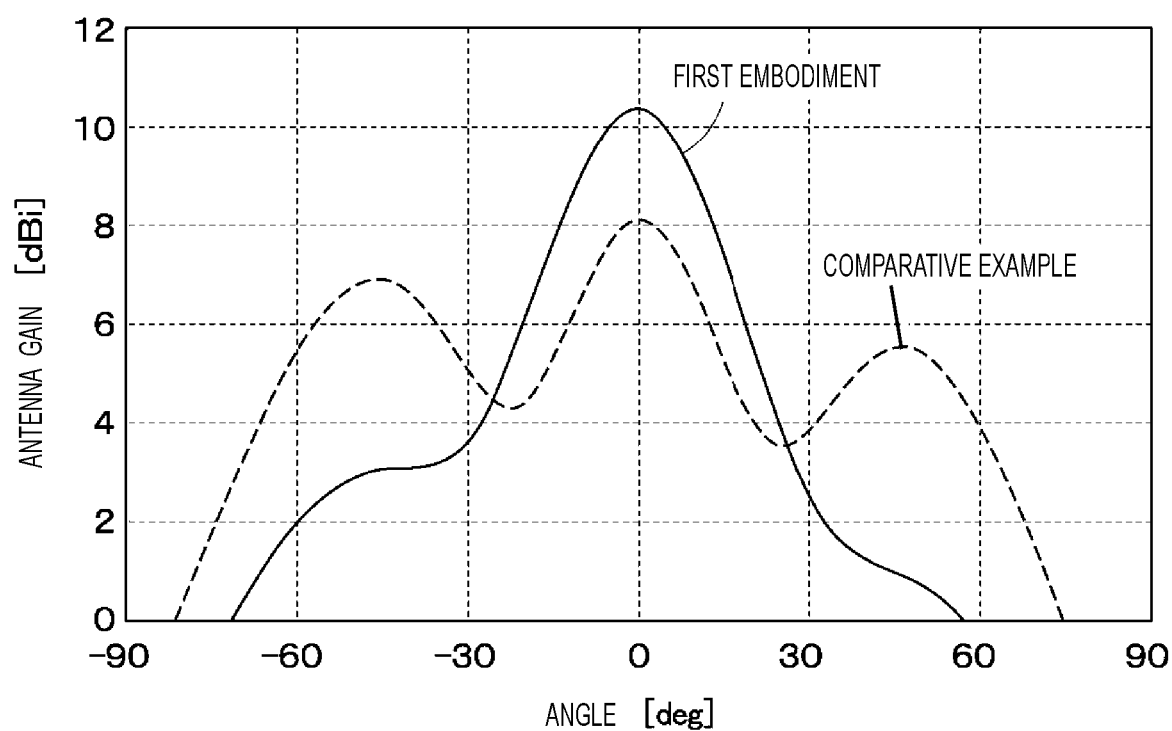
FIG. 5 is a characteristic chart illustrating the relationships between the antenna gain and the radiation angle of a patch antenna.

To verify the above-described effect, the directivity of the electric field direction is obtained in the case where the waveguide structure 14 is provided (first embodiment) and in the case where the waveguide structure 14 is omitted (comparative example). The results are illustrated in FIG. 5. As illustrated in FIG. 5, compared to the comparative example, the antenna gain is improved in the direction with which an angle (radiation angle of the radio wave) is 0°, that is, in the direction perpendicular to the radiation electrode 12 (Z-axis direction) according to the first embodiment.

Figure 6:
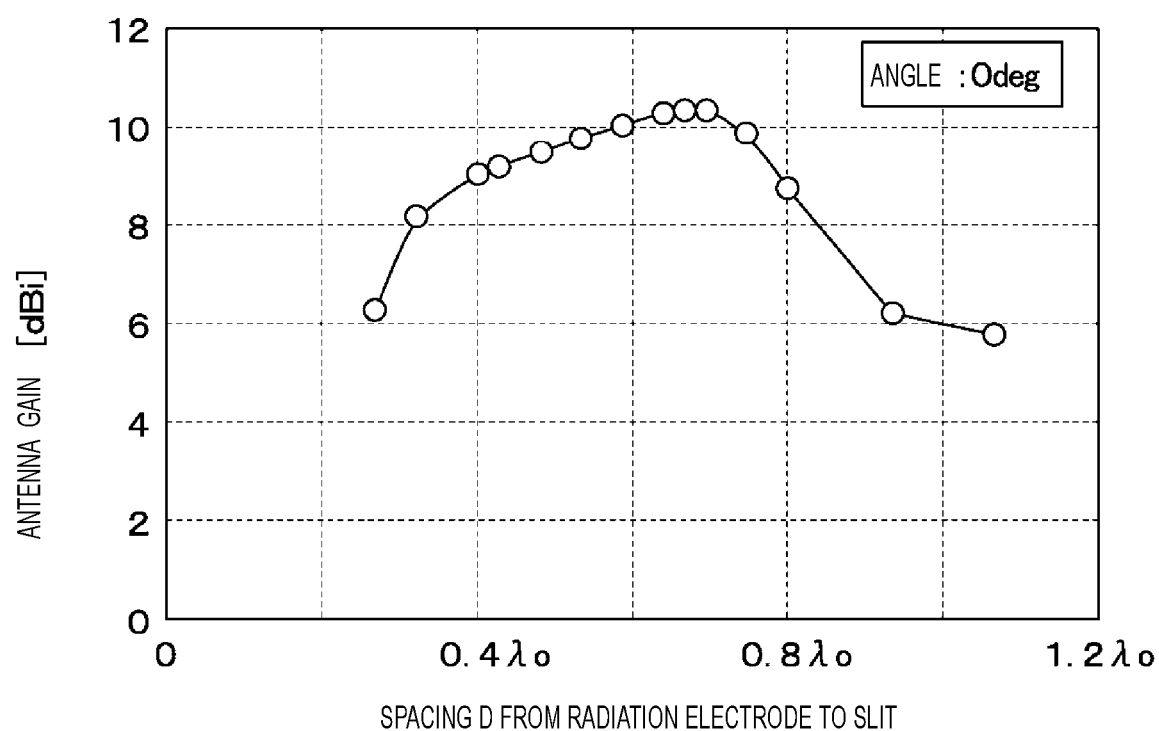
FIG. 6 is a characteristic chart illustrating the relationship between the antenna gain and spacing from a radiation electrode to a slit.

When the radiation electrode 12 and the slit 15 are excessively close to each other, the antenna gain decreases due to the effect of the slit 15. In contrast, when the radiation electrode 12 and the slit 15 are excessively far from each other, the effect of suppressing the surface wave decreases, and accordingly, the antenna gain decreases. Accordingly, the relationship between the spacing D between the radiation electrode 12 and the slit 15 and the antenna gain is obtained. The results are illustrated in FIG. 6. When the spacing D between the radiation electrode 12 and the slit 15 in plan view is smaller than 0.4 times the wavelength $\lambda 0$ of the radio wave emitted by the radiation electrode 12 in free space, the current of the patch antenna is obstructed. In contrast, when the spacing D between the radiation electrode 12 and the slit 15 in plan view is greater than 0.8 times the wavelength $\lambda 0$ of the radio wave emitted by the radiation electrode 12 in free space, a standing wave is generated between the patch antenna and the slit 15, thereby the antenna gain is degraded. Compared to these, as illustrated in FIG. 6, when the spacing D between the radiation electrode 12 and the slit 15 in plan view is greater than or equal to 0.4 times and smaller than or equal to 0.8 times the wavelength $\lambda 0$ of the radio wave emitted by the radiation electrode 12 in free space, neither the obstruction of the current of the patch antenna nor the generation of the standing wave occurs. As a result, the antenna gain is improved.

Furthermore, the width G of the slit 15 in the electric field direction is greater than zero and smaller than or equal to $\frac{1}{10}$ of the wavelength $\lambda 0$ of the radio wave emitted by the radiation electrode 12 in free space ($0 < G \leq \lambda 0/10$). The reason for setting the width G to be smaller than or equal to $\frac{1}{10}$ of the wavelength $\lambda 0$ is that the phases are made to be substantially the same at both ends of the slit 15 in the Y-axis direction so as to obtain the same electric characteristics. Thus, the entirety of the slit 15 becomes a substantially open end.

Furthermore, the radiation electrode 12 is disposed on the first surface 2A of the substrate 2, and the waveguide structure 14 is disposed inside the substrate 2. Thus, when the surface wave propagates through the first ground layer 6 (ground electrode) provided inside the substrate 2, the surface wave propagating through the first ground layer 6 can be suppressed by the waveguide structure 14.

Figure 7:
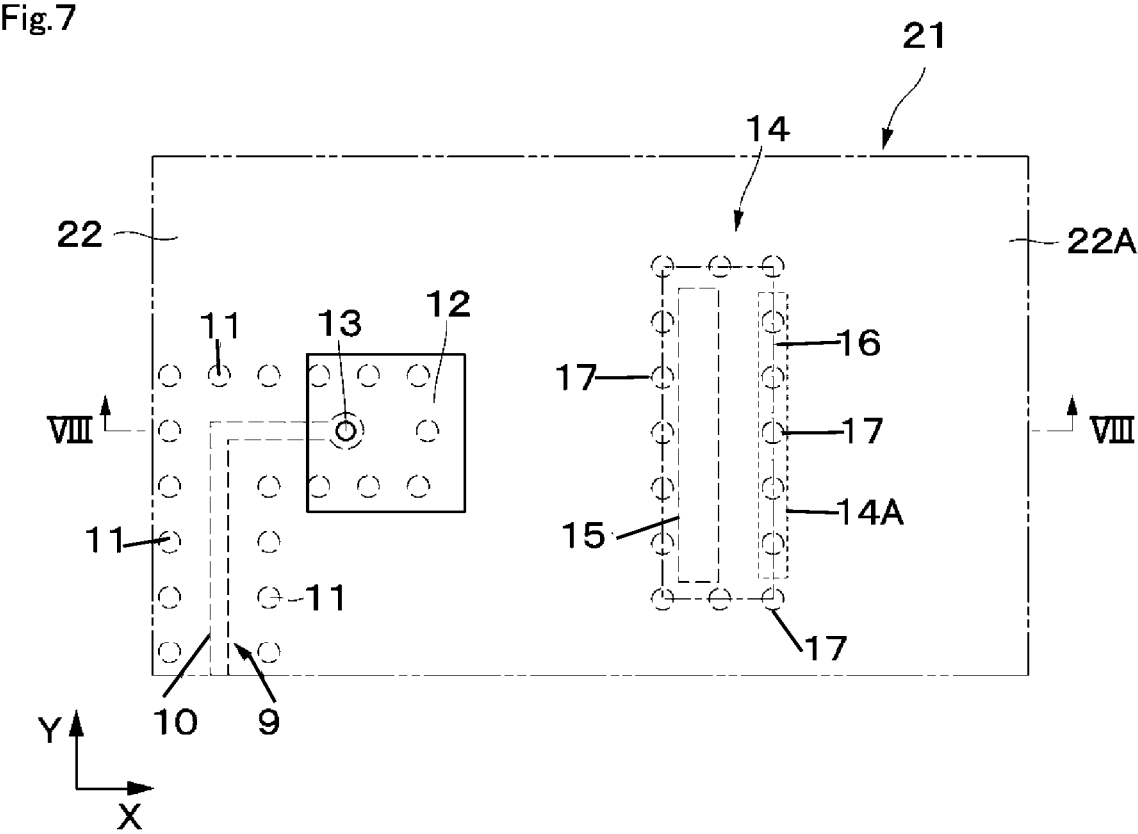
FIG. 7 is an enlarged plan view illustrating an antenna device according to a second embodiment at a position similar to that of FIG. 2.
Figure 8:
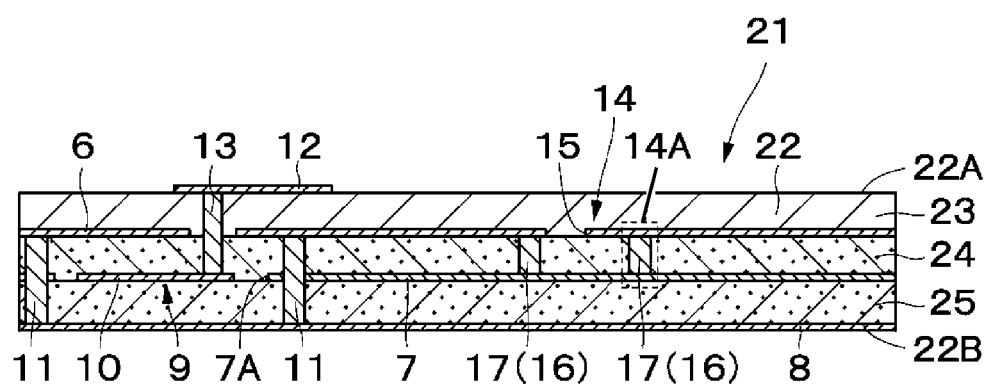
FIG. 8 is a sectional view of the antenna device when seen in an arrow VIII-VIII direction illustrated in FIG. 7.

Next, FIGS. 7 and 8 illustrate a second embodiment of the present disclosure. The second embodiment is characterized in that the relative dielectric constant of the insulating layer at the first surface of the substrate where the radiation electrode is provided is lower than that of the insulating layer inside the substrate where the waveguide structure is provided. In the second embodiment, the same elements as those of the first embodiment are denoted by the same reference signs, and the description thereof is omitted.

An antenna device 21 according to the second embodiment is substantially similarly configured to the antenna device 1 according to the first embodiment. The antenna device 21 includes a substrate 22, the first ground layer 6, the radiation electrode 12, and the waveguide structures 14.

The substrate 22 is formed substantially similarly to the substrate 2 according to the first embodiment and includes three insulating layers 23 to 25 laminated one on top of another in the Z-axis direction from a side of a first surface 22A (first main surface side) toward a side of a second surface 22B (second main surface side). However, a relative dielectric constant 61 of the insulating layer 23 at the first surface 22A of the substrate 22 is lower than a relative dielectric constant 62 of the insulating layer 24 ($\varepsilon 1 < \varepsilon 2$) inside the substrate 22 where the waveguide structure 14 is provided. The insulating layer 25 is formed of, for example, the same material as that of the insulating layer 24. Thus, the insulating layer 25 has the same relative dielectric constant 62 as that of the insulating layer 24. The insulating layer 25 may have the same relative dielectric constant 61 as that of the insulating layer 23 or a relative dielectric constant different from relative dielectric constants of the insulating layers 23 and 24.

The radiation electrode 12 is disposed on the first surface 22A of the substrate 22 (a first surface of the insulating layer 23 opposite the insulating layer 24). The waveguide structure 14 includes the slit 15 and the conductor wall 16. The slit 15 is provided in the first ground layer 6. The conductor wall 16 surrounds the slit 15 and extends in the thickness direction of the substrate 22. The conductor wall 16 includes the plurality of vias 17 formed so as to surround the slit 15. The vias 17 are each formed as a cylindrical conductor substantially similarly to the vias 11. The via 17 is formed to penetrate through the insulating layer 24. The via 17 extends in the Z-axis direction. One and the other ends of the via 17 are respectively connected to the first ground layer 6 and the second ground layer 7. Thus, the waveguide structure 14 is disposed inside the substrate 22.

In this way, the slit 15 is in a state close to a substantially open state also according to the second embodiment. This causes the slit 15 to interrupt (cut) the current of the surface wave flowing through the first ground layer 6. As a result, in addition to enabling the improvement the antenna gain by suppressing the propagation of the surface wave, the size of the entirety of the device can be reduced. Furthermore, according to the second embodiment, the relative dielectric constant 61 of the insulating layer 23 where the radiation electrode 12 is provided is lower than the relative dielectric constant 62 of the insulating layer 24 inside the substrate 22. This can make the band of the antenna device 21 wider in addition to enabling the improvement of the antenna gain. Furthermore, the relative dielectric constant 62 of the insulating layer 24 inside the substrate 22 where the waveguide structure 14 is provided is higher than that of the insulating layer 23 at the first surface 22A of the substrate 22. Thus, the wavelength λg of the radio wave in the waveguide structure 14 can be reduced, and accordingly, the size of the waveguide structure 14 can be reduced.

Figure 9:
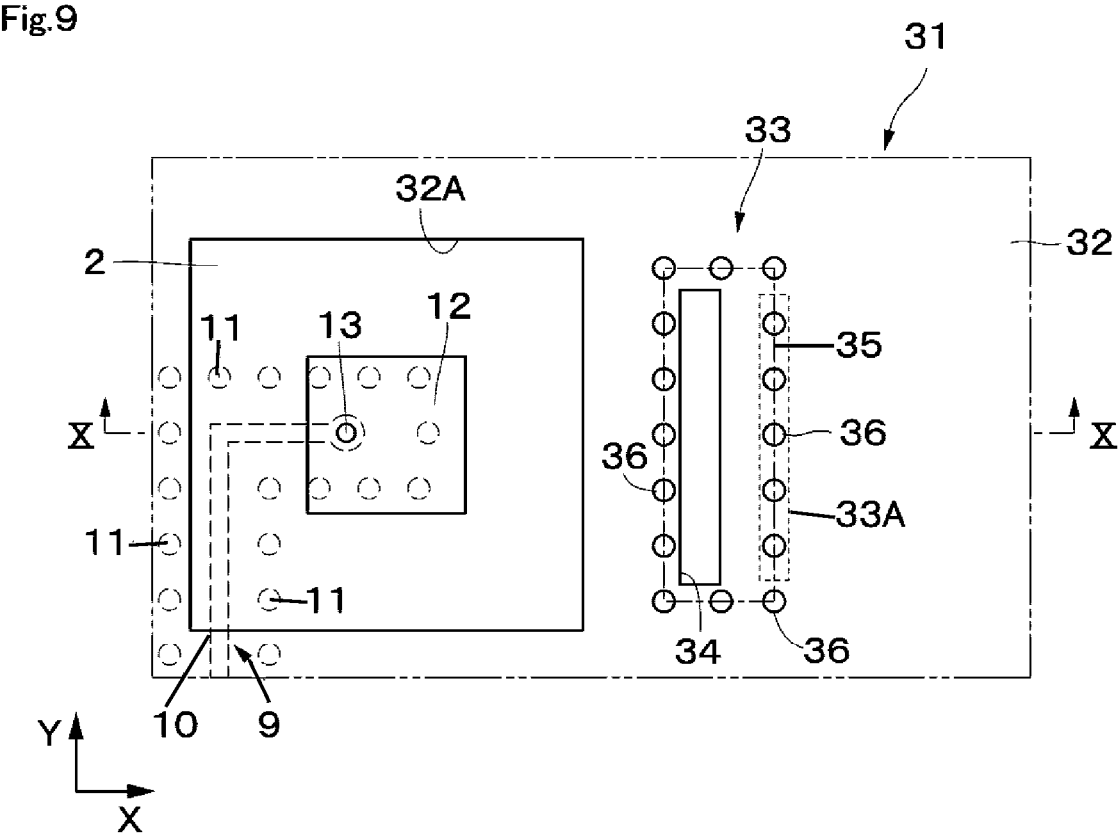
FIG. 9 is an enlarged plan view illustrating an antenna device according to a third embodiment at a position similar to that of FIG. 2.
Figure 10:
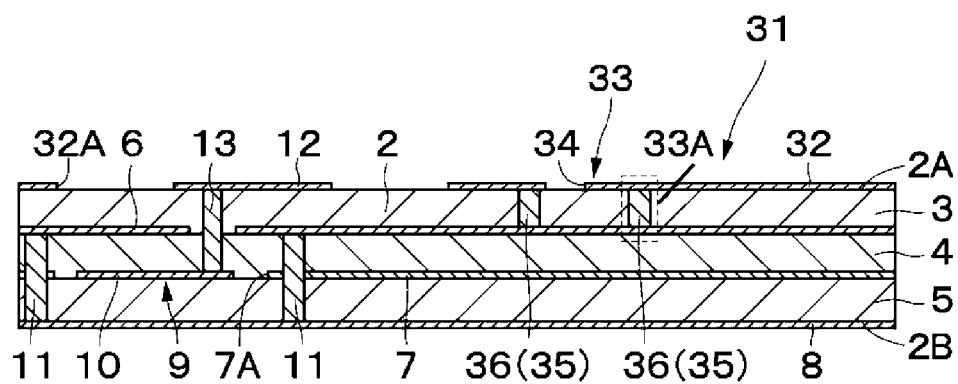
FIG. 10 is a sectional view of the antenna device when seen in an arrow X-X direction illustrated in FIG. 9.

FIGS. 9 and 10 illustrate a third embodiment of the present disclosure. The third embodiment is characterized in that the radiation electrode is disposed on the first surface of the substrate, and the waveguide structure is provided so as to be exposed in the first surface of the substrate. In the third embodiment, the same elements as those of the first embodiment are denoted by the same reference signs, and the description thereof is omitted.

An antenna device 31 according to the third embodiment is substantially similarly configured to the antenna device 1 according to the first embodiment. The antenna device 31 includes the substrate 2, the first ground layer 6, the radiation electrode 12, and waveguide structures 33.

In addition, the antenna device 31 includes a fourth ground layer 32 provided on the first surface 2A of the substrate 2. The fourth ground layer 32 serves as a ground electrode. The fourth ground layer 32 is formed by, for example, a conductive metal thin film formed of the same material as that of the radiation electrode 12. The fourth ground layer 32 covers substantially the entire surface of the substrate 2 except for a region around the radiation electrode 12. Thus, the fourth ground layer 32 has a gap 32A around the radiation electrode 12. The gap 32A is formed by omitting the metal thin film. Thus, the fourth ground layer 32 is disposed on the first surface 2A of the substrate 2 in a state in which the fourth ground layer 32 is insulated from the radiation electrode 12.

Each of the waveguide structures 33 has a slit 34 and a conductor wall 35. The slit 34 is positioned in the electric field direction of the radiation electrode 12 (X-axis direction) in plan view and provided in the fourth ground layer 32. The conductor wall 35 surrounds the slit 34 and extends in the thickness direction of the substrate 2. The waveguide structures 33 are positioned on both sides of the radiation electrode 12 in the X-axis direction (only one of the waveguide structures 33 is illustrated).

The slit 34 is similarly configured to the slit 15 according to the first embodiment. Thus, the slit 34 is formed by an elongated gap formed in the fourth ground layer 32. The slit 34 extends in the Y-axis direction perpendicular to the current of the radiation electrode 12.

The conductor wall 35 includes a plurality of vias 36 formed so as to surround the slit 34. Each of the vias 36 is formed to penetrate through the insulating layer 3. The via 36 extends in the Z-axis direction. One and the other ends of the via 36 are respectively connected to the fourth ground layer 32 and the first ground layer 6. The length from the slit 34 to a terminal portion 33A of the waveguide structure 33 in plan view is about ¼ of the wavelength λg of the radio wave in the waveguide structure 33. The conductor wall 35 may penetrate through the insulating layer 3 and the insulating layer 4 so as to be connected to the ground layer 32 and the second ground layer 7 or penetrate through the insulating layer 3, the insulating layer 4, and the insulating layer 5 so as to be connected to the ground layer 32 and the third ground layer 8.

Thus, also according to the third embodiment, in addition to enabling the improvement of the antenna gain by suppressing the propagation of the surface wave, the size of the entirety of the device can be reduced. Furthermore, according to the third embodiment, the radiation electrode 12 is disposed on the first surface 2A of the substrate 2, and the waveguide structure 33 is provided so as to be exposed in the first surface 2A of the substrate 2. This causes the slit 34 to interrupt (cut) the current of the surface wave flowing through the fourth ground layer 32 (ground electrode) disposed on the first surface 2A of the substrate 2. This can suppress the disturbance of the directivity of the patch antenna caused by the propagation of the surface wave.

According to the third embodiment, the radiation electrode 12 and the fourth ground layer 32 are disposed at the same position (on the same layer) in the thickness direction of the substrate 2. However, the present disclosure is not limited to this. As is the case with an antenna device 41 according to a variant illustrated FIG. 11, the radiation electrode 12 and the fourth ground layer 32 may be disposed at different positions (on different layers) in the thickness direction of the substrate 2. The antenna device 41 includes, for example, a substrate 42 having four insulating layers 43 to 46. The insulating layers 43 to 46 are laminated one on top of another in the Z-axis direction from a side of a first surface 42A toward a side of a second surface 42B. The insulating layer 43 covers the fourth ground layer 32. The fourth ground layer 32 is disposed between the insulating layer 43 and the insulating layer 44. The radiation electrode 12 is provided on the first surface 42A of the substrate 42. The insulating layer 43 is disposed between the radiation electrode 12 and the fourth ground layer 32.

Figure 12:
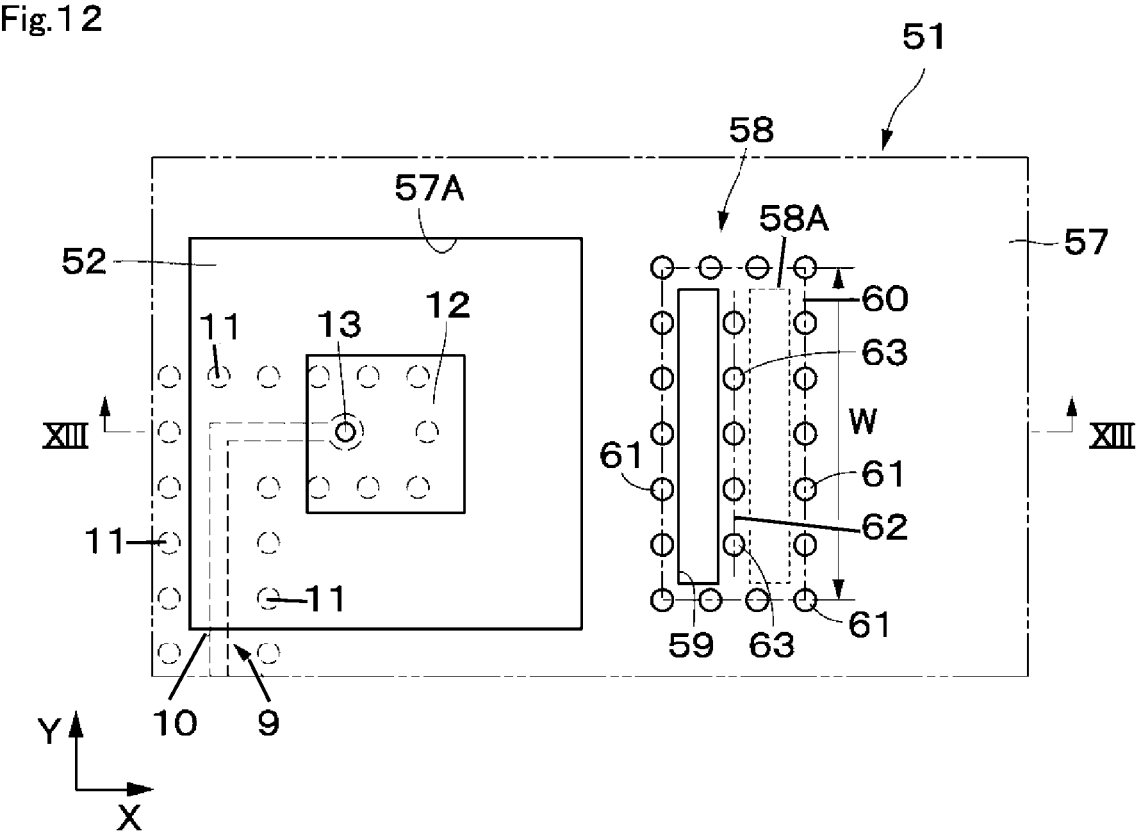
FIG. 12 is an enlarged plan view illustrating an antenna device according to a fourth embodiment at a position similar to that of FIG. 2.
Figure 13:
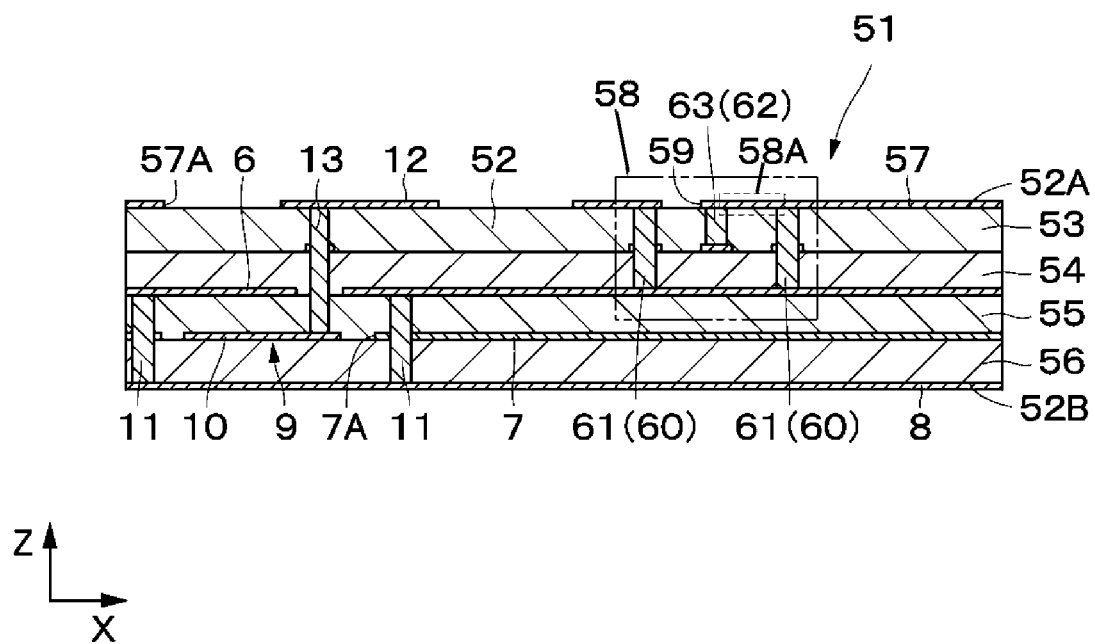
FIG. 13 is a sectional view of the antenna device when seen in an arrow XIII-XIII direction illustrated in FIG. 12.
Figure 14:
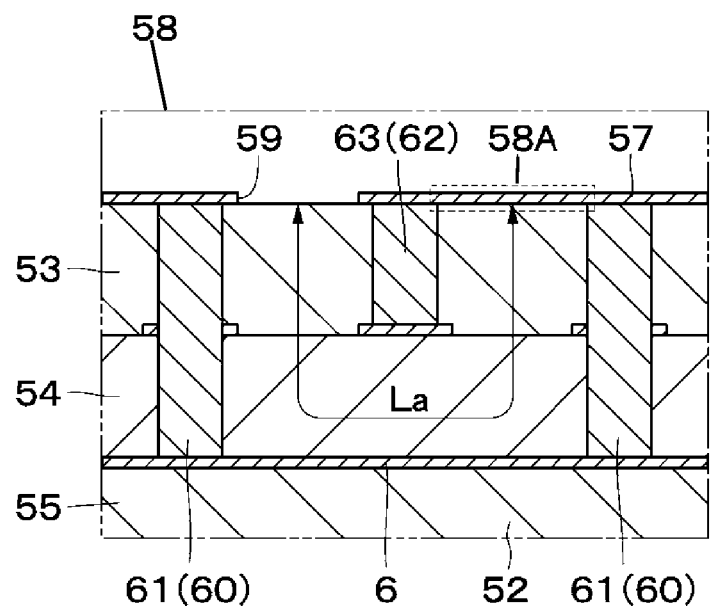
FIG. 14 is an enlarged sectional view illustrating a waveguide structure illustrated in FIG. 13.

Next, FIGS. 12 to 14 illustrate a fourth embodiment of the present disclosure. The fourth embodiment is characterized in that the waveguide structure has a folded shape in the thickness direction of the substrate. In the fourth embodiment, the same elements as those of the first embodiment are denoted by the same reference signs, and the description thereof is omitted.

An antenna device 51 according to the fourth embodiment is substantially similarly configured to the antenna device 1 according to the first embodiment. The antenna device 51 includes a substrate 52, the first ground layer 6, the radiation electrode 12, and waveguide structures 58.

The substrate 52 includes four insulating layers 53 to 56 laminated one on top of another in the Z-axis direction from a side of a first surface 52A (first main surface side) toward a side of a second surface 52B (second main surface side) (see FIG. 13). The first ground layer 6 is positioned between the insulating layer 54 and the insulating layer 55. The second ground layer 7 is positioned between the insulating layer 55 and the insulating layer 56. The third ground layer 8 is positioned on the second surface 52B of the substrate 52 (a second surface of the insulating layer 56 opposite the insulating layer 55). The fourth ground layer 57 is positioned on the first surface 52A of the substrate 52 (a first surface of the insulating layer 53 opposite the insulating layer 54). Each of the first ground layer 6, the second ground layer 7, the third ground layer 8, and the fourth ground layer 57 are formed of a conductive metal material and covers substantially the entire surface of the substrate 52.

The fourth ground layer 57 serves as a ground electrode. The fourth ground layer 57 has a gap 57A around the radiation electrode 12. The gap 57A is formed by omitting the metal thin film. Thus, the fourth ground layer 57 is disposed on the first surface 52A of the substrate 52 in a state in which the fourth ground layer 57 is insulated from the radiation electrode 12.

Each of the waveguide structures 58 has a slit 59 and a conductor wall 60. The slit 59 is positioned in the electric field direction of the radiation electrode 12 in plan view and provided in the fourth ground layer 57. The conductor wall 60 surrounds the slit 59 and extends in the thickness direction of the substrate 52. The waveguide structures 58 are positioned on both sides of the radiation electrode 12 in the X-axis direction (only one of the waveguide structures 58 is illustrated).

The slit 59 is similarly configured to the slit 15 according to the first embodiment. Thus, the slit 59 is formed by an elongated gap formed in the fourth ground layer 57. The slit 59 extends in the Y-axis direction perpendicular to the current of the radiation electrode 12.

The conductor wall 60 is formed to have a quadrangular frame shape surrounding the slit 59. The conductor wall 60 includes a plurality of vias 61. The vias 61 are each formed as a cylindrical conductor. The via 61 is formed to penetrate through the insulating layers 53 and 54. The via 61 extends in the Z-axis direction. One and the other ends of the via 61 are respectively connected to the fourth ground layer 57 and the first ground layer 6. The conductor wall 60 may penetrate through the insulating layer 53, the insulating layer 54, and the insulating layer 55 so as to be connected to the ground layer 57 and the ground layer 7 or penetrate through the insulating layer 53, the insulating layer 54, the insulating layer 55, and the insulating layer 56 so as to be connected to the ground layer 57 and the ground layer 8.

The waveguide structure 58 further includes an intermediate wall 62. The substrate 52 is provided with the intermediate wall 62 positioned inside the conductor wall 60. The intermediate wall 62 is positioned between parts of the conductor wall 60 in the X-axis direction. The intermediate wall 62 includes a plurality of vias 63. The vias 63 are each formed as a cylindrical conductor. The via 63 is formed to penetrate through the insulating layer 53. The via 63 extends in the Z-axis direction. Thus, the intermediate wall 62 extends from the first surface 52A of the substrate 52 to a partway position of the conductor wall 60 in the thickness direction. That is, the intermediate wall 62 is formed to penetrate through the insulating layer 53. Thus, the intermediate wall 62 has a smaller depth (thickness) than that of the conductor wall 60. The intermediate wall 62 is provided through the entire length of the conductor wall 60 having a frame shape in the Y-axis direction. Thus, the waveguide structure 58 forms a folded rectangular waveguide in the thickness direction (Z-axis direction) of the substrate 52. The folded rectangular waveguide refers to a waveguide in which, when seen from a side surface, the conductor wall 60 on a first end side in the X-axis direction, the first ground layer 6, the conductor wall 60 on a second end side in the X-axis direction, the fourth ground layer 57, and the intermediate wall 62 are disposed in a spiral shape having angles.

The dimension W of the waveguide structure 58 in the magnetic field direction in plan view is greater than ½ of the wavelength λa of the radio wave in the medium of the substrate 52. A length La from the slit 59 to a terminal portion 58A of the waveguide structure 58 is about ¼ of the wavelength λg of the radio wave in the waveguide structure 58. At this time, the terminal portion 58A of the waveguide structure 58 is a portion where a reflected wave is generated. The reflected wave is generated by input of the radio wave from the slit 59 and reflection of the inputted radio wave in the waveguide structure 58 so as to be returned to the slit 59. In addition, the waveguide structure 58 has the folded structure in the thickness direction (Z-axis direction) of the substrate 52. Thus, the terminal portion 58A of the waveguide structure 58 is the fourth ground layer 57 positioned at a terminal position of the waveguide structure 58 folded in the Z-axis direction. Thus, the length La is a propagation path length from the slit 59 to the terminal portion 58A of the waveguide structure 58. Specifically, the length La is the length from the slit 59 to the terminal portion 58A of the waveguide structure 58 passing through an intermediate position between a side end portion of the insulating layer 54 of the intermediate wall 62 and the surface of the ground layer 6.

Thus, also according to the fourth embodiment, in addition to enabling the improvement of the antenna gain by suppressing the propagation of the surface wave, the size of the entirety of the device can be reduced. Furthermore, according to the fourth embodiment, the waveguide structure 58 has a folded shape in the thickness direction of the substrate 52. Thus, the size of the waveguide structure 58 in the X-axis direction can be reduced compared to that of the first embodiment, and accordingly, the size of the waveguide structure 58 can be reduced.

According to the fourth embodiment, the waveguide structure 58 is folded once in the thickness direction of the substrate 52. However, the present disclosure is not limited to this. The waveguide structure may be folded a plurality of times in the thickness direction of the substrate.

Figure 15:
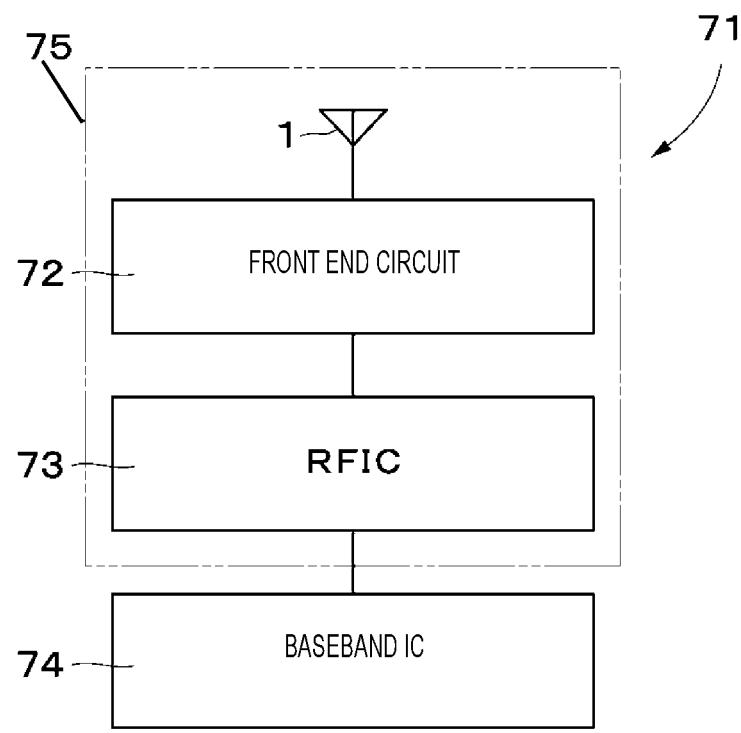
FIG. 15 is a block diagram illustrating a communication device according to a fifth embodiment.

Next, with reference to FIG. 15, a fifth embodiment of the present disclosure is described. The fifth embodiment is characterized in that the antenna device according to the present disclosure is applied to an antenna module and a communication device. In the fifth embodiment, the same elements as those of the first embodiment are denoted by the same reference signs, and the description thereof is omitted.

FIG. 15 is a block diagram illustrating the configuration of a communication device 71 according to the fifth embodiment. The communication device 71 includes the antenna device 1, a front end circuit 72, a radio-frequency integrated circuit (RFIC) 73, and a baseband integrated circuit (IC) 74. The communication device 71 transmits/receives the radio wave. An antenna module 75 includes the antenna device 1, the front end circuit 72, and the RFIC 73. The front end circuit 72 may be integrated with the RFIC 73. That is, the RFIC 73 may include the front end circuit 72.

The front end circuit 72 amplifies a transmission radio-frequency (RF) signal generated by the RFIC 73 by using a power amplifying circuit (not illustrated) and supplies the amplified signal to the antenna device 1 through a duplexer (not illustrated). The front end circuit 72 also amplifies a reception RF signal received by the antenna device 1 by using a low-noise amplifying circuit (not illustrated) through the duplexer and supplies the amplified signal to the RFIC 73.

The RFIC 73 converts a transmission signal generated by the baseband IC 74 into the transmission RF signal and supplies the converted signal to the front end circuit 72. This conversion may include modulation and up-conversion of the signal. The RFIC 73 also converts the reception RF signal received from the front end circuit 72 into a reception signal and supplies the converted signal to the baseband IC 74. This conversion may include demodulation and down-conversion of the signal.

The baseband IC 74 converts transmission data into the transmission signal and supplies the converted signal to the RFIC 73. This conversion may include compression of the data, multiplexing of the data, and addition of an error correction code to the data. The baseband IC 74 also converts the reception signal received from the RFIC 73 into reception data. This conversion may include expansion, demultiplexing, and an error correction of the data.

Thus, also according to the fifth embodiment configured as described above, in addition to enabling the improvement of the antenna gain by suppressing the propagation of the surface wave, the size of the entirety of the device can be reduced. Furthermore, since the size of the antenna device 1 can be reduced, the sizes of the communication device 71 and the antenna module 75 can be reduced according to the fifth embodiment.

According to the fifth embodiment, the antenna device 1 according to the first embodiment is applied to the communication device 71 and the antenna module 75. However, the antenna device 21, 31, 51 according to any one of the second to fourth embodiments may be applied to the communication device and the antenna module.

Figure 16:
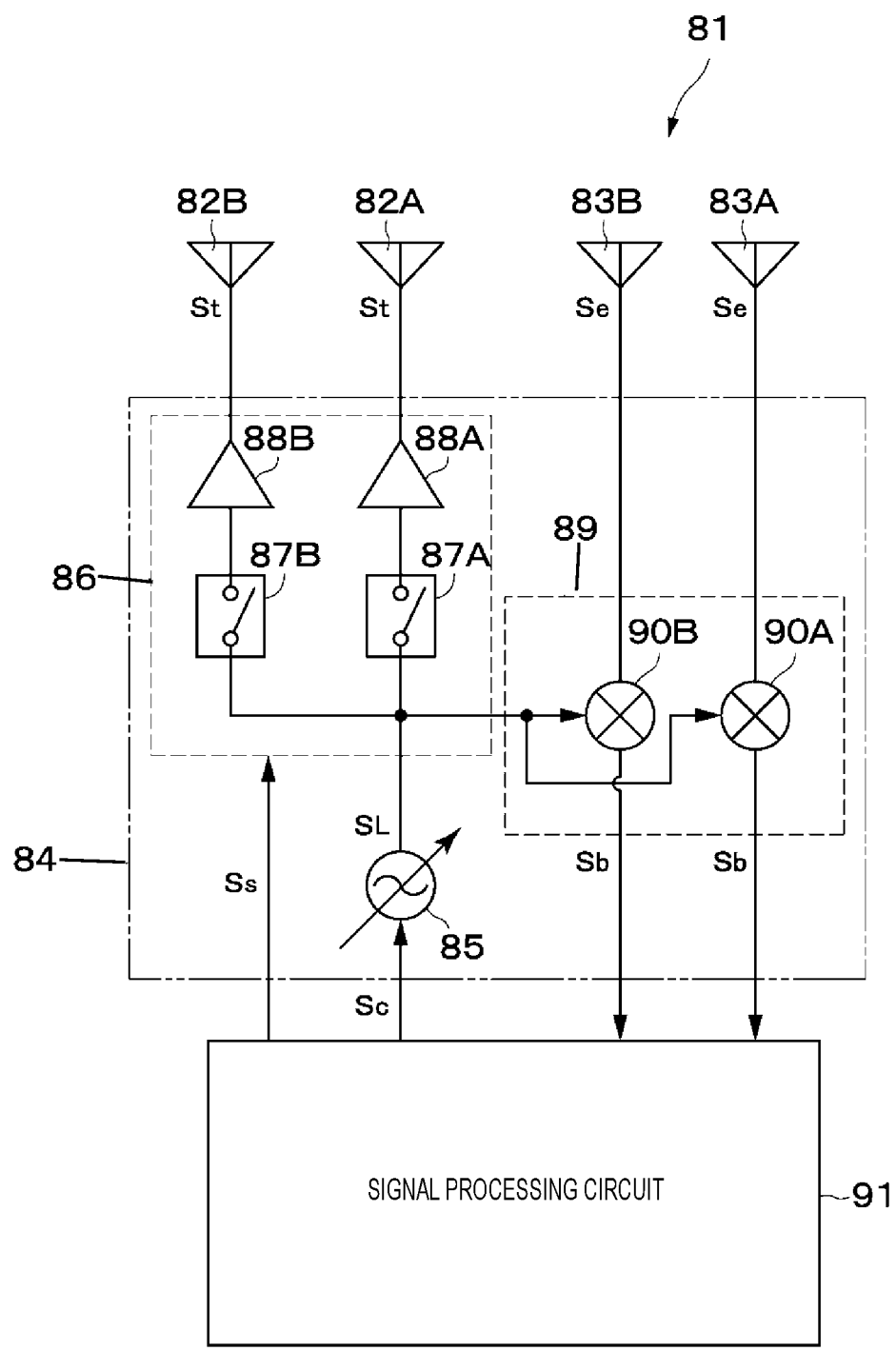
FIG. 16 is a block diagram illustrating a radar device according to a sixth embodiment.

Next, with reference to FIG. 16, a sixth embodiment of the present disclosure is described. The sixth embodiment is characterized in that the antenna device according to the present disclosure is applied to a radar device. In the sixth embodiment, the same elements as those of the first embodiment are denoted by the same reference signs, and the description thereof is omitted.

FIG. 16 illustrates a radar device 81 according to the sixth embodiment. The radar device 81 has the functions of time-division multiple access (TDMA), the frequency-modulated continuous wave (FMCW), and the multiple-input multiple-output (MIMO).

The radar device 81 includes transmission antennas 82A, 82B, reception antennas 83A, 83B, an RF module 84, and a signal processing circuit 91.

The transmission antennas 82A, 82B each emit a local signal SL outputted from the RF module 84 to the air. This signal is emitted to the air as a transmission signal St. The reception antennas 83A, 83B receive an echo signal Se which is, when a target reflects the transmission signal St, returned from the target due to the reflection. The transmission antennas 82A and 82B and the reception antennas 83A and 83B each include the antenna device 1 according to the first embodiment.

The RF module 84 includes a local oscillator 85, a transmission unit 86, and a reception unit 89.

The local oscillator 85 oscillates the local signal SL. Based on a chirp control signal Sc from the signal processing circuit 91, the local oscillator 85 outputs the local signal SL of a chirp waveform the frequency of which linearly increases or decreases over time. The local oscillator 85 outputs the generated local signal SL to the transmission unit 86 and the reception unit 89.

The transmission unit 86 transmits, as the transmission signal St, the local signal SL outputted from the local oscillator 85 from the transmission antennas 82A, 82B. The transmission unit 86 includes switches 87A, 87B and power amplifiers 88A, 88B. The switches 87A, 87B are turned on and off based on a switching control signal Ss from the signal processing circuit 91. When the switches 87A, 87B are turned on, the local signal SL is transmitted to the power amplifiers 88A, 88B. The power amplifiers 88A, 88B amplify the power of the local signal SL transmitted from the local oscillator 85 and output the amplified signal to the transmission antennas 82A, 82B.

The reception unit 89 outputs a beat signal Sb from the local signal SL and the echo signal Se made by reflection of the transmission signal St by the target and received by the reception antennas 83A, 83B. Specifically, the reception unit 89 generates the beat signal Sb by multiplying the echo signal Se received by the reception antennas 83A, 83B by the local signal SL outputted from the local oscillator 85. The reception unit 89 includes mixers 90A, 90B that multiply the echo signal Se by the local signal SL.

The signal processing circuit 91 performs signal processing on the beat signal Sb. The signal processing circuit 91 includes, for example, an analog to digital (AD) converter, a microcomputer, and so forth.

The signal processing circuit 91 outputs the chirp control signal Sc to the local oscillator 85. The signal processing circuit 91 outputs to the transmission unit 86 the switching control signal Ss controlling the output of the transmission signal St. The signal processing circuit 91 also performs the measurement of the distance (ranging) to the target and the measurement of the azimuth by using the beat signal Sb outputted from the reception unit 89. The present disclosure can be applied not only to the radar device 81 of the FMCW method but also to a radar device of another method.

Thus, also according to the sixth embodiment configured as described above, in addition to enabling the improvement of the antenna gain by suppressing the propagation of the surface wave, the size of the entirety of the device can be reduced. Furthermore, since the sizes of the transmission antennas 82A, 82B and the reception antennas 83A, 83B can be reduced, the size of the radar device 81 can be reduced according to the sixth embodiment.

According to the sixth embodiment, the antenna device 1 according to the first embodiment is applied to the radar device 81. However, the antenna device 21, 31, 51 according to any one of the second to fourth embodiments may be applied to the radar device.

According to the above-described embodiments, the power is fed to the radiation electrode 12 through the triplate line 9. However, the present disclosure is not limited to this. The power is not necessarily fed to the radiation electrode through a microstrip line and may be fed to the radiation electrode through a coplanar line.

According to the above-described embodiments, the radiation electrode 12 is formed to have a quadrangular shape. However, the radiation electrode 12 may be formed to have another shape such as a circular shape.

According to the above-described embodiments, the conductor wall 16, 35, 60 of the waveguide structure 14, 33, 58 is formed by the vias 17, 36, 61. However, the present disclosure is not limited to this. For example, the conductor wall may be formed by a conductor plate embedded in the substrate.

According to the above-described embodiments, the antenna devices 1, 21, 31, 51 used for millimeter waves are cited as the examples for the description. However, the antenna device is not necessarily used for the millimeter waves. The technique may be applied to an antenna device used for, for example, microwaves.

The above-described embodiments are only exemplary. Of course, the configurations described for different embodiments can be partially substituted or combined.

Next, as the antenna device, the antenna module, the communication device, and the radar device included in the above-described embodiments, for example, the following forms can be conceived.

According to a first form, an antenna device includes a substrate, a ground electrode, a radiation electrode, and a waveguide structure. The substrate includes a plurality of insulating layers laminated one on top of another. The ground electrode is provided in or on the substrate. The radiation electrode is provided on the substrate. The waveguide structure has a slit and a conductor wall. The slit is positioned in an electric field direction of the radiation electrode in plan view and provided in the ground electrode. The conductor wall surrounds the slit and extends in a thickness direction of the substrate. A dimension of the waveguide structure in a magnetic field direction of the radiation electrode in the plan view is greater than ½ of a wavelength of a radio wave emitted by the radiation electrode in a medium of the substrate. A length from the slit to a terminal portion of the waveguide structure in the electric field direction of the radiation electrode in the plan view is about ¼ of a wavelength of the radio wave emitted by the radiation electrode in the waveguide structure.

According to the first form, the slit is in a state close to a substantially open state. This causes the slit to interrupt a current of a surface wave flowing through the ground electrode, and accordingly, the disturbance of the directivity of the antenna device due to propagation of the surface wave can be suppressed. Thus, it is not required to provide a certain number of AMC elements around a patch antenna, and accordingly, the size of the antenna device can be reduced.

According to a second form, in the first form, spacing between the radiation electrode and the slit in the plan view is greater than or equal to 0.4 times and smaller than or equal to 0.8 times a wavelength of the radio wave emitted by the radiation electrode in free space. Thus, the antenna gain can be improved.

According to a third form, in the first or second form, a width of the slit in the electric field direction is smaller than or equal to ¹⁄₁₀ of a wavelength of the radio wave emitted by the radiation electrode in free space.

According to the third form, the entirety of the slit becomes substantially open. In addition, the slit does not become unnecessarily large, and accordingly, the size of the waveguide structure can be reduced.

According to a fourth form, in any one of the first to third forms, the radiation electrode is disposed on a first surface of the substrate, and the waveguide structure is disposed inside the substrate.

According to the fourth form, when the surface wave propagates through the ground electrode provided inside the substrate, the surface wave propagating through the ground electrode can be suppressed by the waveguide structure.

According to a fifth form, in any one of the first to third forms, the radiation electrode is disposed on a first surface of the substrate, and the waveguide structure is provided so as to be exposed in the first surface of the substrate.

According to the fifth form, when the surface wave propagates through the ground electrode provided on the first surface of the substrate, the surface wave propagating through the ground electrode can be suppressed by the waveguide structure.

According to a sixth form, in any one of the first to third forms, the radiation electrode is disposed on a first surface of the substrate, the waveguide structure further includes an intermediate wall, and the waveguide structure has a shape folded in the thickness direction of the substrate. Thus, the size of the waveguide structure can be reduced.

According to a seventh form, in any one of the first to third forms, the radiation electrode is disposed on a first surface of the substrate, the waveguide structure is disposed inside the substrate, and a relative dielectric constant of one of the insulating layers at the first surface of the substrate where the radiation electrode is provided is lower than a relative dielectric constant of one of the insulating layers inside the substrate where the waveguide structure is provided.

According to the seventh form, the relative dielectric constant of the insulating layer where the radiation electrode is provided is low. This can make the band of the antenna device wider in addition to enabling the improvement of the antenna gain. Furthermore, the relative dielectric constant of the insulating layer inside the substrate where the waveguide structure is provided is high. Thus, the size of the waveguide structure can be reduced.

An antenna module according to an eighth form includes the antenna device according to any one of the first to seventh forms and a radio-frequency integrated circuit.

A communication device according to a ninth form includes the antenna device according to any one of the first to seventh forms, a radio-frequency integrated circuit, and a baseband integrated circuit. This communication device transmits and receives a radio wave. Thus, the size of the communication device can be reduced.

A radar device according to a tenth form includes the antenna device according to any one of the first to seventh forms, a radio-frequency module, and a signal processing circuit. Thus, the size of the radar device can be reduced.

1, 21, 31, 41, 51 antenna device
2, 22, 42, 52 substrate
2A, 22A, 42A, 52A first surface
6 first ground layer (ground electrode)
12 radiation electrode
14, 33, 58 waveguide structure
14A, 33A, 58A terminal portion
15, 34, 59 slit
16, 35, 60 conductor wall
32, 57 fourth ground layer (ground electrode)
62 intermediate wall
71 communication device
73 RFIC
74 baseband IC
75 antenna module
81 radar device
82A, 82B transmission antenna (antenna device)
83A, 83B reception antenna (antenna device)
84 RF module

The invention claimed is:
1. An antenna device comprising:
a substrate that includes a plurality of insulating layers laminated one on top of another;
a ground electrode provided in or on the substrate;
a radiation electrode provided on the substrate; and
a waveguide structure that has:
a slit that is positioned in an electric field direction of the radiation electrode in plan view and that is provided in the ground electrode, and
a conductor wall that surrounds the slit and that extends in a thickness direction of the substrate, wherein:
a dimension of the waveguide structure in a magnetic field direction of the radiation electrode in the plan view is greater than ½ of a wavelength of a radio wave emitted by the radiation electrode in a medium of the substrate,
the radiation electrode and the slit are provided in different positions in the plan view,
a length from the slit to a terminal portion of the waveguide structure in the electric field direction of the radiation electrode in the plan view is about ¼ of a wavelength of the radio wave emitted by the radiation electrode in the waveguide structure, the radiation electrode is disposed on a first surface of the substrate, and the waveguide structure is provided so as to be exposed in the first surface of the substrate.

2. The antenna device according to claim 1, wherein a spacing between the radiation electrode and the slit in the plan view is greater than or equal to 0.4 times and smaller than or equal to 0.8 times a wavelength of the radio wave emitted by the radiation electrode in free space.

3. The antenna device according to claim 1, wherein a width of the slit in the electric field direction is smaller than or equal to 1/10 of a wavelength of the radio wave emitted by the radiation electrode in free space.

4. The antenna device according to claim 2, wherein a width of the slit in the electric field direction is smaller than or equal to 1/10 of a wavelength of the radio wave emitted by the radiation electrode in free space.

5. The antenna device according to claim 1, wherein the waveguide structure is disposed inside the substrate.

6. The antenna device according to claim 2, wherein the waveguide structure is disposed inside the substrate.

7. The antenna device according to claim 3, wherein the waveguide structure is disposed inside the substrate.

8. The antenna device according to claim 1, wherein the waveguide structure further includes an intermediate wall and has a shape folded in the thickness direction of the substrate.

9. The antenna device according to claim 2, wherein the waveguide structure further includes an intermediate wall and has a shape folded in the thickness direction of the substrate.

10. The antenna device according to claim 3, wherein the waveguide structure further includes an intermediate wall and has a shape folded in the thickness direction of the substrate.

11. The antenna device according to claim 1, wherein:
the waveguide structure is disposed inside the substrate, and a relative dielectric constant of one of the insulating layers at the first surface of the substrate where the radiation electrode is provided is lower than a relative dielectric constant of one of the insulating layers inside the substrate where the waveguide structure is provided.

12. The antenna device according to claim 2, wherein:
the waveguide structure is disposed inside the substrate, and a relative dielectric constant of one of the insulating layers at the first surface of the substrate where the radiation electrode is provided is lower than a relative dielectric constant of one of the insulating layers inside the substrate where the waveguide structure is provided.

13. The antenna device according to claim 3, wherein:
the waveguide structure is disposed inside the substrate, and a relative dielectric constant of one of the insulating layers at the first surface of the substrate where the radiation electrode is provided is lower than a relative dielectric constant of one of the insulating layers inside the substrate where the waveguide structure is provided.

14. An antenna module comprising:
the antenna device according to claim 1; and
a radio-frequency integrated circuit.

15. A communication device comprising:
the antenna device according to claim 1;
a radio-frequency integrated circuit; and
a baseband integrated circuit,
wherein the communication device transmits and receives a radio wave.

16. A radar device comprising:
the antenna device according to claim 1;
a radio-frequency module; and
a signal processing circuit.

17. A radar device comprising:
the antenna device according to claim 2;
a radio-frequency module; and
a signal processing circuit.

* * * * *